United States Patent [19]

Inoue et al.

[11] Patent Number: 5,223,495
[45] Date of Patent: Jun. 29, 1993

[54] COATING COMPOSITION CONTAINING A HYDROLYZABLE SILYL GROUP CONTAINING VINYLIC POLYMER

[75] Inventors: Masaharu Inoue; Hisao Furukawa; Yasushi Kato; Katsuhiko Isayama, all of Hyogo, Japan

[73] Assignee: Kanegafuchi Kagaku Kogyo Kabushiki Kaisha, Osaka, Japan

[21] Appl. No.: 610,897

[22] Filed: Nov. 9, 1990

[30] Foreign Application Priority Data

Nov. 10, 1989 [JP] Japan .................. 1-293177

[51] Int. Cl.$^5$ .................................................. C08K 5/54
[52] U.S. Cl. .................. 524/188; 524/261; 524/262; 524/263; 525/100; 525/102
[58] Field of Search ............... 524/188, 261, 262, 263; 525/100, 102

[56] References Cited

U.S. PATENT DOCUMENTS 4,174,229 11/1979 Boberski et al. ................. 524/503 X
4,288,356 9/1981 Huebner et al. .
5,004,771 4/1991 Feder et al. .......................... 524/161

FOREIGN PATENT DOCUMENTS 274428 7/1988 European Pat. Off. .

OTHER PUBLICATIONS

Patent Abstracts of Japan, vol. 6, No. 197 (C-128)(1075), Oct. 6, 1982.

*Primary Examiner*—Joseph L. Schofer
*Assistant Examiner*—Jeffrey T. Smith
*Attorney, Agent, or Firm*—Armstrong, Westerman, Hattori, McLeland & Naughton

[57] ABSTRACT

A curable coating composition comprising
(A) from 10 to 99 parts by weight of a silyl group-containing vinylic polymer having a number average molecular weight of at least 3,000, the main chain thereof being substantially composed of a vinylic polymer chain and having at least one silicon atom bonded to a hydrolyzable group at a terminal of the main chain and/or at a side chain in each molecule,
(B) from 1 to 90 parts by weight of an organic compound having a number average molecular weight of not larger than 3,000 and having at least one silicon atom bonded to a hydrolyzable group at a terminal in each molecule, and
(C) from 1 to 500 parts by weight of silanol-containing organopolysiloxane having, on an average, at least one sianol group in one molecule to 100 parts by weight of the total amount of the component (A) and the component (B).

10 Claims, No Drawings

COATING COMPOSITION CONTAINING A HYDROLYZABLE SILYL GROUP CONTAINING VINYLIC POLYMER

FIELD OF THE INVENTION

This invention relates to a coating composition which has low toxicity, gives a high solids coating, and has an improved external appearance and curability. More particularly, the invention relates to a curing composition useful as a finishing coating composition for motor cars.

BACKGROUND OF THE INVENTION

Coating resins which have hitherto been used for the exterior finishing of buildings, motor cars, industrial machines, metal furniture, household electric furnishings/ plastics, etc., are mainly melamine resins such as alkyd melamine and acryl melamine or two-part type urethane resins.

Of these resins, melamine resins have such problems that harmful formalin is generated at curing and the cured coating is inferior in acid resistance and is liable to be corroded by acidic rain.

Also, with a two-part type urethane resin, there is a problem relating to the toxicity of isocyanate compounds used in the resin.

For solving the aforesaid problems, the inventors have investigated vinylic polymers having a silicon atom bonded to a hydrolyzable group (hydrolyzable silyl group) for coating compositions. As a result thereof, it was found that the aforesaid vinylic polymer could solve the aforesaid problems and give a curable coating resin having excellent weather resistance (JP-A-63-132977) (the term "JP-A" as used herein means an "unexamined published Japanese patent application").

On the other hand, there is a trend toward regulating the total amount of solvents generated during the application of a coating composition, e.g., the VOC (volatile organic compound) regulation of the United States.

The feature of the vinylic polymer having a hydrolyzable silyl group is that the silyl group is hydrolyzed by moisture in air and the polymer is cured through a condensation reaction. Also, since the polymer is cured while forming a stable siloxane bond, the cured coating is excellent in chemical resistance and weather resistance as compared with a melamine resin such as acryl melamine or alkyd melamine, or a two-part type urethane resin.

Moreover, when a vinylic polymer having a hydrolyzable silyl group is used as a finishing coating composition for motor cars, there are the following four problems.

First, the external appearance which is most important for a finishing coating composition for motor cars is not always satisfactory.

Second, since the curing reaction largely depends upon humidity, curing reaction under a low humidity is delayed.

Third, with the polymer alone, it is difficult to form a high solids coating which meets the VOC regulation of the United States.

Fourth, as a finishing coating composition for motor cars, the impact resistance is not always sufficient.

SUMMARY OF THE INVENTION

As the result of various investigations for further solving the aforesaid problems, the inventors have succeeded in accomplishing the present invention.

That is, according to this invention, there is provided a coating composition comprising (A) from 10 to 99 parts (by weight) of a hydrolyzable silyl group-containing vinylic polymer having a number average molecular weight of at least 3,000, the main chain thereof being substantially composed of a vinylic polymer chain and having at least one silicon atom bonded to a hydrolyzable group at a terminal of the main chain and/or of a side chain in each molecule, (B) from 1 to 90 parts of an organic compound having a number average molecular weight of not larger than 3,000 and having at least one silicon atom bonded to a hydrolyzable group at a terminal in each molecule, and (C) from 1 to 500 parts, based on 100 parts of the total amount of component (A) and component (B), of a silanol-containing organo-polysiloxane having, on an average, at least one sianol group in each molecule.

DETAILED DESCRIPTION OF THE INVENTION

The hydrolyzable silyl group-containing vinylic component which is component (A) in this invention is a polymer, the main chain thereof being substantially composed of a vinylic polymer chain, having at least one, and preferably from 2 to 10 silicon atoms bonded to a hydrolyzable group at a terminal of the main chain and/or of a side chain. The polymer is generally obtained by a copolymerization, of a vinylic monomer and a hydrolyzable silyl group-containing monomer, and may contain a urethane bond or a siloxane bond in the main chain or side chains.

The aforesaid term "substantially composed of a vinylic polymer" means that the polymer obtained mainly exhibits the properties of a vinylic polymer and usually means that at least about 60%, and preferably at least about 80%, of the units constituting the main chain are composed of vinylic units.

There is no particular restriction on the aforesaid vinylic monomer, and useful monomers are unsaturated polycarboxylic acid esters such as methyl (meth)acrylate, ethyl (meth)acrylate, butyl (meth)acrylate, isobutyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, diesters or half esters of unsaturated polycarboxylic acids (maleic acid, fumaric acid, itaconic acid, etc.) and a straight chain or branched alcohol having from 1 to 20 carbon atoms; aromatic hydrocarbon series vinyl compounds such as styrene, α-methylstyrene, chlorostyrene, styrenesulfonic acid, 4-hydroxystyrene, vinyltoluene, etc.; vinyl esters and allyl compounds, such as vinyl acetate, vinyl propionate, diallyl phthalate, etc.; amide group-containing vinyl compounds such as (meth)acrylamide, itaconic acid diamide, α-ethyl (meth)acrylamide, crotonamide, maleic acid diamide, fumaric acid diamide, N-vinylpyrrolidone, N-butoxymethyl (meth)acrylamide, N,N-dimethylacrylamide, N-methylacrylamide, acryloylmorpholine, etc.; hydroxy group-containing vinyl compounds such as 2-hydroxyethyl (meth)acrylate, 2-hydroxypropyl (meth)acrylate, 2-hydroxyethyl vinyl ether, N-methylol (meth)acrylamide, Aronix 5700 (trade name, made by Toagosei Chemical Industry Co., Ltd.) having a formula

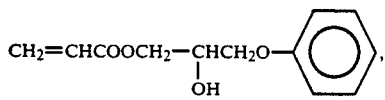

Placcel FA-1 (caprolactone acrylate: n=1), Placcel FA-4 (polycaprolactone methacrylate: n=4), Placcel FM-1 (caprolactone methacrylate: n=1), Placcel FM-4 (polycaprolactone acrylate n=4) (trade name, made by Daicel Chemical Industries, Ltd.), etc.; unsaturated carboxylic acids such as (meth)acrylic acid, maleic acid, fumaric acid, itaconic acid, the salts of these acids (alkali metal salts, ammonium salts, amine salts, etc.), maleic anhydride, itaconic anhydride, etc.; and other vinyl compounds such as vinyl methyl ether, vinyl chloride, vinylidene chloride, chloroprene, propylene, butadiene, isoprene, maleimide, N-vinylimidazole, vinylsulfonic acid, etc.

As the aforesaid hydrolyzable silyl group-containing monomer, there is, for example, a monomer moiety represented by the following formula:

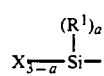

wherein $R^1$ represents a hydrogen atom or a monovalent hydrocarbon group selected from an alkyl group having from 1 to 10 carbon atoms, an aryl group, and an aralkyl group; X represents a hydrolyzable group selected from a halogen atom, an alkoxy group having from 1 to 10 carbon atoms, an acyloxy group having from 1 to 10 carbon atoms, an aminoxy group, a phenoxy group having from 6 to 10 carbon atoms, a thioalkoxy group having from 1 to 10 carbon atoms, and an amino group; a represents 0 or an integer of 1 or 2; and when two or more Xs and $R^1$s are bonded to Si, said Xs or $R^1$s may be the same or different. A typical example of the monomer is an alkoxysilyl group-containing vinyl monomer (K).

Specific examples of the aforesaid alkoxysilyl group-containing vinyl monomer (K) are shown below.

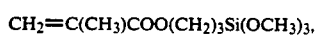

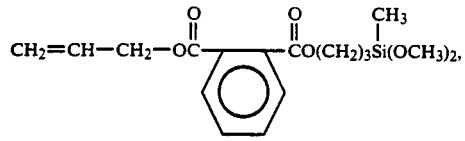

-continued

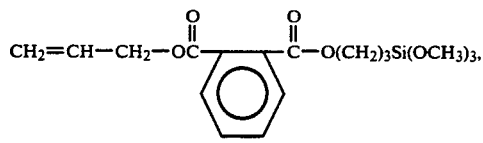

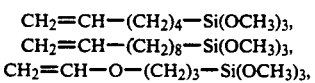
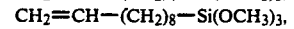
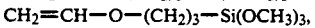

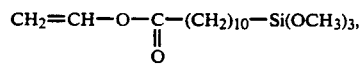

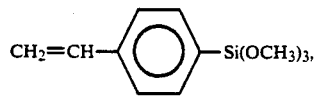

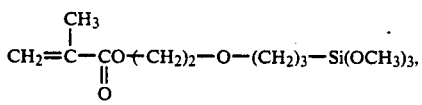

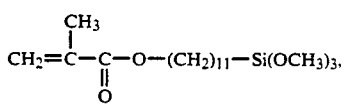

The aforesaid description relates to the case of producing component (A) for use in this invention from a relatively low molecular weight vinylic monomer and a hydrolyzable silyl group-containing monomer. However, for further improving the impact resistance and the solvent resistance of the coating formed, it is preferred that the hydrolyzable silyl group containing vinylic polymer (A) is obtained by a copolymerization of a macromonomer (D); a vinylic monomer (E), and, if necessary, an alkoxylsilyl group-containing vinyl monomer (K) shown below.

The aforesaid macromonomer (D) is a macromonomer having a carbon-carbon double bond and a hydrolyzable silyl group in one molecule and having a number average molecular weight of from 400 to 5,000, and preferably from 500 to 4,000, and specific examples of the macromonomer (D) are those having the following structures:

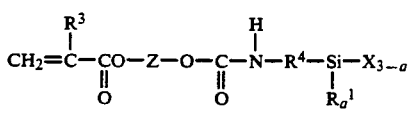

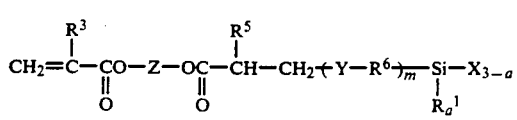

-continued

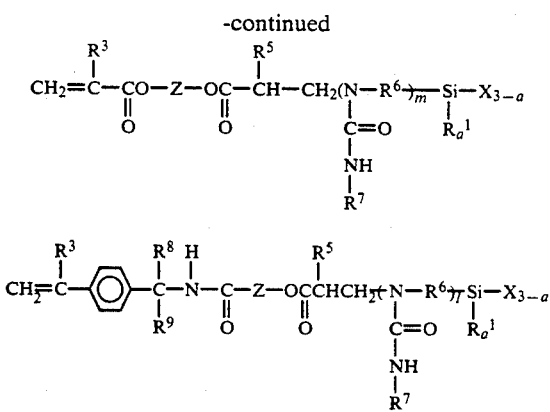

In the above formulae, $R^1$ represents a hydrogen atom or a monovalent hydrocarbon group having from 1 to 10 carbon atoms; $R^3$, $R^5$, $R^8$ and $R^9$ each independently represents a hydrogen atom or an alkyl group having from 1 to 10 carbon atoms; $R^4$ and $R^6$ each independently represents a divalent alkyl group having from 1 to 10 carbon atoms, an aryl group, or an aralkyl group; $R^7$ represents an alkyl group having from 1 to 30 carbon atoms, an aryl group, an aralkyl group, $(C_2H_5O)_3Si(CH_2)_3$, or $(CH_3O)_3Si(CH_2)_3$; X represents a hydrolyzable group selected from a halogen atom, an alkoxy group, an acyloxy group, an aminoxy group, a phenoxy group, a thioalkoxy group, and an amino group; Y represents —S— or

(wherein $R^{10}$ represents a hydrogen atom or an alkyl group having from 1 to 10 carbon atoms); Z represents a divalent organic group which contains one or more organic groups selected from a polymethylene group, a polyether group, a polyester group, an organopolysiloxane group, a polyamido group, and a polyurethane group; a represents an integer of from 0 to 2; m represents an integer of from 1 to 10; and l represents an integer of from 1 to 10. Among the macromonomers (D), a macromonomer having from 1 to about 30 groups

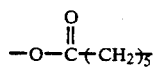

in each molecule is preferred from the standpoint of imparting flexibility to the coating formed and also a macromonomer having from 1 to about 10 groups

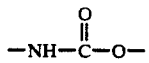

is preferred from the standpoint of imparting solvent resistance to the coating formed.

Processes for producing the macromonomers (D) are described, e.g., in JP-A-63-112605 and JP-A-63-112610.

There is no particular restriction on the vinylic monomer (E) to be copolymerized with the macromonomer (D), and the aforesaid vinylic monomers which can be used for obtaining the hydrolyzable silyl group-containing polymer as component (A) for use in this invention can be used.

Furthermore, in the copolymerization, one or more kinds of the aforesaid macromonomers (D), one or more kinds of the vinylic monomers (E), and also one or more kinds of the alkoxysilyl group-containing vinyl monomer (K) can be used.

The hydrolyzable silyl group-containing monomer units (a total of (D) and (K)) are contained in the component (A) in the amount of preferably from 5 to 90% (by weight), and more preferably from 11 to 70% based on a total amount of the monomer moiety in component (A).

The copolymer of the hydrolyzable silyl group-containing vinyl monomer and the vinylic monomer can be produced by the processes described in JP-A-54-36395, JP-A-57-36109 and JP-A-58-157810 but it is more preferable to produce the copolymer by a solution polymerization method using an azoic radical initiator such as azobis-isobutyronitrile, etc.

Also, if necessary, the molecular weight of the product can be adjusted using a chain transfer agent such as n-dodecylmercaptan, t-dodecylmercaptan, n-butylmercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si—S—S—Si—(OCH_3)_3$, $(CH_3O)_3Si(CH_2)_3S—S—(CH_2)_3Si(OCH_3)_3$, $(CH_3O)_3Si—S—S—Si(OCH_3)_3$, etc. In particular, by using a chain transfer agent having a hydrolyzable silyl group in the molecule, such as γ-mercaptopropyltrimethoxysilane, etc., the hydrolyzable silyl group can be introduced into a terminal end of the vinylic copolymer produced.

As the polymerization solvent which is used for the aforesaid solution polymerization, there are non-reactive solvents such as hydrocarbons (e.g., toluene, xylene, n-hexane, and cyclohexane), acetic acid esters (e.g., ethyl acetate and butyl acetate), alcohols (e.g., methanol, ethanol, isopropanol, and n-butanol), ethers (e.g., ethylcellosolve, butylcellosolve, and cellosolve acetate), ketones (e.g., methyl ethyl ketone, ethyl acetoacetate, acetylacetone, diacetone alcohol, methyl isobutyl ketone, and acetone), etc. These solvents can be used without any particular restriction.

If the molecular weight of component (A) is low, the proportion of non-crosslinked components is increased and hence the number average molecular weight of component (A) is at least 3,000, and preferably from 3,000 to 10,000.

The hydrolyzable silyl group-containing organic compound which is component (B) for use in this invention is a compound having at least one hydrolyzable silyl group at a terminal of each molecule represented by the following formula

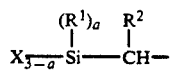

wherein $R^1$, X, and a are same as described above; $R^2$ represents a hydrogen atom or a monovalent hydrocarbon group selected from an alkyl group having from 1 to 10 carbon atoms, an aryl group, and an aralkyl group.

To increase the crosslinked points it is effective for the hydrolyzable silyl group-containing compound to contain two or more the silyl groups. Also, the silyl group preferably exists at the terminal of the molecule since it can more effectively take part in the crosslinking reaction.

Also, the number average molecular weight of the compound is not larger than 3,000, and preferably from 300 to 2,000. If the number average molecular weight of the compound is less than 300, the compound becomes volatile, does not readily form a solid component, that is, is unsuitable for forming a high solids coating, and shock resistance is lowered. Also, if the number average molecular weight of the compound is over 3,000, the viscosity is increased and it is difficult to form a high solids coating of the coating composition.

The addition amount of the hydrolyzable silyl group-containing organic compound, component (B), is from 1 to 90 parts, and preferably from 5 to 80 parts, with respect to from 10 to 99 parts, and preferably from 20 to 95 parts, of the silyl group-containing vinylic polymers, component (A); the total amount of component (A) and component (B) being 100 parts.

If the content of component (B) is less than 1 part, the viscosity of the coating composition is high and it is difficult to form a high solids coating. On the other hand, if the content thereof is over 90 parts, the appearance and initial drying property of the coating are inferior.

Examples of the aforesaid hydrolyzable silyl group-containing organic compound are compounds shown by following structural formulae:

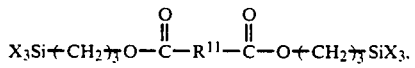

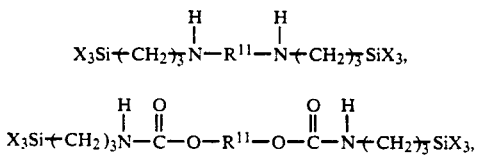

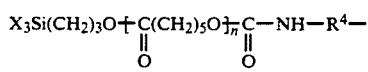

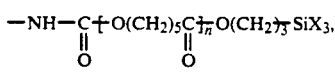

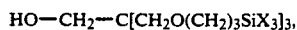

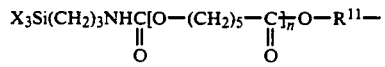

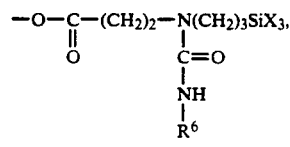

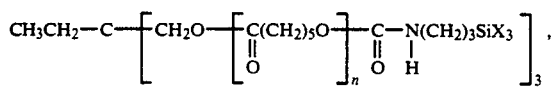

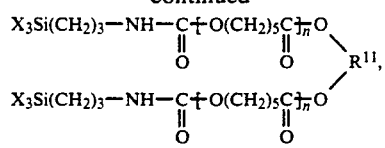

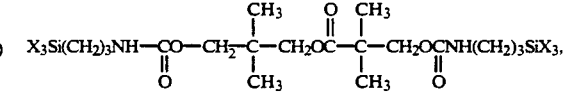

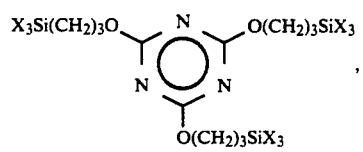

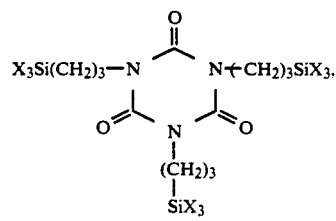

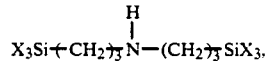

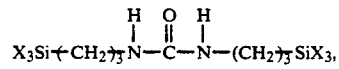

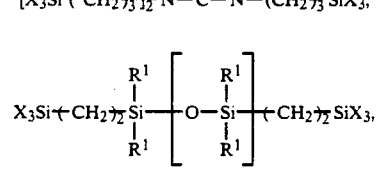

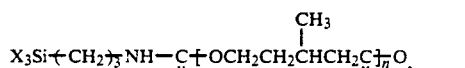

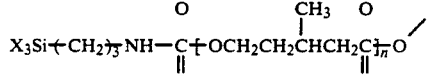

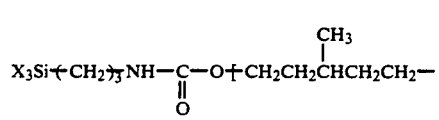

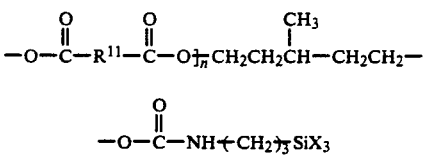

(wherein $R^{11}$ represents a divalent alkyl group having from 1 to 30 carbon atoms, an aryl group, or an aralkyl groups, and so forth).

The aforesaid compounds have a low viscosity and hence are effective for forming a high solids coating of the coating curing composition.

The aforesaid compounds containing

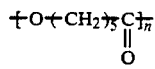

in the molecule are effective for improving impact resistance.

Also, the aforesaid compounds may be used singly or as a mixture thereof.

The silanol-containing organopolysiloxane compound which is component (C) for use in this invention is a compound having, on an average, at least one, preferably from 2 to 6 silanol groups. If the content of the silanol groups is less than 1 per molecule, the improvement in external appearance and curability, which are the effects of this invention, are less. On the other hand, if the content of the silanol groups is over 6, the viscosity is sometimes increased and thus it becomes difficult to form a high solids coating.

The number average molecular weight of component (C) is preferably from 200 to 3,000. If the number average molecular weight is less than 200, the compound becomes volatile, does not readily form a solid component, and shock resistance is lowered. If the number average molecular weight is over 3,000, the viscosity is increased, whereby it becomes difficult to form a high solids coating.

Practical examples of the component (C) are

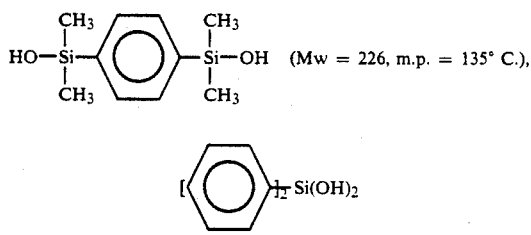

(Mw=216, m.p.=140° C.), TSR160 and YR3168 (silanol organo polysiloxane; trade names, made by Toshiba Silicone K.K.), SH6018 (silanol organo polysiloxane; trade name, made by Toray Silicone K.K.), and KR-211, KR-212, KR-214, and KR-216 (silanol organo polysiloxane; trade name, made by Shin-Etsu Chemical Co., Ltd.).

Of these materials, SH6018 made by Toray Silicone K.K. and KR-216 made by Shin-Etsu Chemical Co., Ltd. which are silanol-containing phenyl-substituted cyclic organopolysiloxanes, are excellent in external appearance of the cured coating, curability, and solvent resistance and are preferred in this invention.

The reason why the silanol-containing organopolysiloxane, component (C), improves the external appearance of the cured coating and curability of the coating composition has not yet been clarified but it is believed that the silanol group of component (C) causes directly a condensation reaction with the hydrolyzable silyl groups of component (A) and component (B) without causing a hydrolysis reaction, which requires water, for a crosslinking reaction, whereby the humidity dependence of the curing reaction is less, and as the result thereof, the crosslinking reaction also proceeds uniformly from the inside of the coating, and external appearance is improved.

Since the reaction of the low molecular weight component (B) having a hydrolyzable silyl group at a terminal end of molecule with the component (C) is much faster than a reaction of component (A) with (C), it is one of the remarkable characteristics of the present invention to improve curability of the components.

The addition amount of component (C) is from 1 to 500 parts, preferably from 5 to 200 parts, and more preferably from 10 to 150 parts, based on 100 parts of the total amount of component (A) and component (B). If the addition amount of component (C) is less than 1 part, the aforesaid effects of improving the appearance of the cured coating and the curability of the coating composition become insufficient. Also, if the amount of component (C) is over 500 parts, the compatibility and the shock resistance of the coating composition are deteriorated.

In addition, the compounds useful as component (C) may be used singly or as a mixture thereof.

The coating composition of this invention can further contain a hydrolyzable ester compound (F) as a dehydrating agent and an alkyl alcohol (C) as a solvent.

Examples of the dehydrating agent (F) are ester compounds such as methyl orthoformate, ethyl orthoformate, methyl orthoacetate, ethyl orthoacetate, ethyl silicate, methyl silicate, etc., and hydrolyzable ester compounds such as methyltrimethoxysilane, etc. The dehydrating agent (F) can be added to the composition during polymerization or after polymerization of the component (A). The addition amount of the dehydrating agent (F) is preferably not more than 100 parts, and more preferably not more than 50 parts, based on 100 parts of the total amount of the solid components comprising component (A), component (B), and component (C).

Also, as the alkyl alcohol (G) as a solvent, there are alkyl alcohols, the alkyl group of which has from 1 to 10 carbon atoms. Examples of such an alcohol are methanol, ethanol, n-propanol, isopropanol, n-butanol, isobutanol, sec-butanol, tert-butanol, n-amyl alcohol, isoamyl alcohol, hexyl alcohol, octyl alcohol, and cellosolve.

There is no particular restriction on the amount of the aforesaid alcohol, but the amount thereof is usually not more than 100 parts, and preferably not more than 50 parts, based on 100 parts of the total amount of the solid components of component (A), component (B), and component (C). When the solvent is used without using the dehydrating agent, the aforesaid amount is usually from 0.5 to 100 parts, and preferably from 2 to 50 parts.

When the aforesaid alcohol (G) and the aforesaid dehydration agent (F) are used, the storage stability of the composition composed of component (A), component (B), and component (C) is remarkably improved as compared to the case of not using component (G) and component (F) together. The amount of the solvent for obtaining the aforesaid effect differs according to the molecular weights and compounding ratio of component (A), component (B), and component (C) but the amount can be adjusted such that the composition has a practically necessary solids component concentration and viscosity.

Furthermore, the coating composition of this invention can contain a curing catalyst (H). Examples of the curing catalyst (H) are organotin compounds such as dibutyltin dilaurate, dibutyltin dimaleate, dioctyltin dilaurate, dioctyltin dimaleate, tin octylate, etc.; phosphoric acid and phosphoric acid esters such as phosphoric acid, monomethyl phosphate, monoethyl phosphate, monobutyl phosphate, monooctyl phosphate, monodecyl phosphate, dimethyl phosphate, diethyl phosphate, dibutyl phoshphate, dioctyl phosphate, didecyl phosphate, etc.; propylene oxide; butylene oxide; cyclohexene oxide; glycidyl methacrylate, glycidol; acrylglycidyl ether; γ-glycidoxypropylmethoxysilane; γ-glycidoxypropyltriethoxysilane, γ-glycidoxypropylmethyl dimethoxysilane,

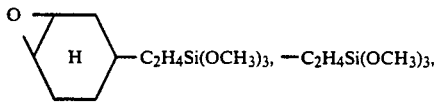

addition reaction products of epoxy compounds and phosphoric acid and/or monoacid phosphoric acid esters, such as Cardula E (trade name, made by Yuka Shell Epoxy K.K.), Epikote 828 and Epikote 1001 (bisphenol A type epoxy resin; trade names, made by Yuka Shell Epoxy K.K.); Organic titanate compounds; organic aluminum compounds; acid compounds such as maleic acid, adipic acid, azelaic acid, sobacic acid, itaconic acid, citric acid, succinic acid, phthalic acid, trimellitic acid, pyromellitic acid, acid anhydrides of the above acids, p-toluenesulfonic acid, etc.; amines such as hexylamine, di-2-ethylhexylamine, N,N-dimethyldodecylamine, dodecylamine, etc.; reaction products of the aforesaid amines and acid phosphoric acid esters; and alkaline compounds such as sodium hydroxide, potassium hydroide, etc.

Of these curing catalysts (H), organic tin compounds, acid phosphates, the reaction products of acid phosphates and amines, saturated or unsaturated polyhydric carboxylic acids or the acid anhydrides thereof, organic titanate compounds, organic aluminum compounds, or mixtures of them are preferred owing to their high activity.

These curing catalysts (H) can be used singly or as a mixture thereof.

There is no particular restriction on the amount of component (H) but the amount thereof is usually from 0.05 to 20 parts, and preferably from 0.05 to 10 parts based on 100 parts of the total amount of the solid components of component (A), component (B), and component (C). If the amount of component (H) is less than 0.05 part, the curability of the coating composition tends to be lowered and if the amount is over 20 parts, the external appearance of the coating tends to be inferior.

Furthermore, when the coating curing composition of this invention is used as a top coat, the weather resistance of the coating can be further improved by compounding a ultraviolet absorbent (I) and light stabilizer (J) with the composition.

As the ultraviolet absorbent (I), conventionally known compounds can be used and, for example, benzophenone series, triazole series, phenylsalicylate series, diphenylacrylate series, and acetophenone series ultraviolet absorbents are preferably used.

Also, as the light stabilizer (J), conventionally known compounds can be used and examples thereof are bis(2,2,6,6-tetramethyl-4-piperidyl) sebacate, bis-(1,2,2,6,6-pentamethyl-4-piperidyl)-sebacate, 2-(3,5-ditert-butyl-4-hydroxybenzyl)-2-n-butylmalonic acid, bis-(1,2,2,6,6-pentamethyl-4-piperidyl)-tetrakis(2,2,6,6-tetramethyl-4-piperidyl)-1,2,3,4-butane tetracarboxylate, and tetrakis(1,2,2,6,6-pentamethyl-4-piperidyl)-1,2,3,4-butane tetracarboxylate. These compounds can be used singly or as a mixture thereof.

By using the ultraviolet absorbent and the light stabilizer together for a top coat clear coating composition, the weathering resistance of the coating can be more improved.

The compounding amount of the ultraviolet absorbent is usually from 0.1 to 10 parts, and preferably from 1 to 5 parts, based on 100 parts of the amount of the solid components of the top coat clear coating composition. Also, the compounding amount of the light stabilizer is usually from 0.1 to 10 parts, and preferably from 1 to 5 parts, based on 100 parts of the amount of the solid components of the top coat clear coating composition.

Furthermore, the top coat clear coating composition of this invention can contain, according to the intended use, additives such as a diluting agent, a repelling inhibitor, a leveling agent, etc.; cellulosic compounds such as nitrocellulose, cellulose acetate butyrate, etc.; and resins such as an epoxy resin, a melamine resin, a vinyl chloride resin, chlorinated polypropylene, chlorinated rubber, polyvinyl butyral, etc.

There is no particular restriction on the preparation method for the top coat clear coating composition composed of the aforesaid components but the composition is prepared, for example, by cold blending component (A), component (B), and component (C), or mixing component (A), component (B), and component (C) and after heating (hot blending) the mixture to conduct a partial reaction, mixing the heated mixture with component (H).

The coating composition of this invention is further explained by referring to the following examples, which are not to be construed as limiting the scope thereof. Unless otherwise indicated, all parts, percents and ratios are by weight.

SYNTHETIC EXAMPLE 1

A mixed solution of the following composition 1-1, composition 2, composition 3, and composition 4 was prepared as shown below.

Composition 1-1

| | |
|---|---|
| Styrene (hereinafter, ST) | 13 g |
| Methyl methacrylate (MMA) | 37 g |
| γ-Trimethoxysilylpropylmethyl methacrylate (TSMA) | 16 g |
| Butyl acrylate (BA) | 33 g |
| Acrylamide (AM) | 1 g |
| γ-Trimethoxysilylpropylmercaptan (TSSH) | 3 g |
| Methanol (MeOH) | 2 g |
| 2,2'-Azobisisobutyronitrile (AIBN) | 4 g |
| Butyl acetate (BuAc) | 8 g |
| Mixed solution of the above components. | |
| Composition 2 | |
| BuAc | 14 g |
| Xylene | 10 g |
| Mixed solution of the above components. | |
| Composition 3 | |
| AIBN | 0.4 g |
| BuAc | 10 g |
| Mixed solution of the above components. | |
| Composition 4 | |
| Methyl orthoacetate (MOA) | 4 g |
| MeOH | 4 g |
| Mixed solution of the above components. | |

The mixed solution of Composition 1-1 was added dropwise to the mixed solution of Composition 2 heated to 110° C. at a constant addition rate under a nitrogen gas atmosphere over a period of 5 hours. Then, the mixed solution of Composition 3 was added dropwise to the mixture at a constant addition rate over a period of one hour. Thereafter, the resultant mixture was stirred for 2 hours at 110° C. and then cooled to room temperature. Finally, the mixed solution of Composition 4 was added thereto followed by stirring.

The solid component concentration of the mixed solution thus obtained was 64%.

Also, when the compound obtained was analyzed by GPC, the number average molecular weight was 3500.

SYNTHETIC EXAMPLE 2

A mixed solution of the following Composition 1-2, Composition 2, Composition 3, and Composition 4 was prepared by the following manner.

Composition 1-2

---

Macromonomer $$\left( CH_2=\underset{\underset{O}{\|}}{\overset{\overset{CH_3}{|}}{C}}-CO-(CH_2)_2-O[CO(CH_2)_5-O]_{\overline{n}} \right.$$

$$\left. -CONH(CH_2)_3Si(OCH_3)_3 \right)$$

| | |
|---|---|
| ST | 31 g |
| MMA | 13 g |
| TSMA | 38 g |
| BA | 9 g |
| AM | 8 g |
| TSSH | 1 g |
| MeOH | 3 g |
| AIBN | 2 g |
| BuAc | 4 g |
| | 8 g |

Mixed solution of the above components.

Composition 2

| | |
|---|---|
| BuAc | 14 g |
| Xylene | 10 g |

Mixed solution of the above components.

Composition 3

| | |
|---|---|
| AIBN | 0.4 g |
| BuAc | 10 g |

Mixed solution of the above components.

Composition 4

| | |
|---|---|
| MOA | 4 g |
| MeOH | 4 g |

Mixed solution of the above components.

---

The mixed solution of Composition 1-2 was added dropwise to the mixed solution of Composition 2 heated to 110° C. at a constant rate under a nitrogen gas atmosphere over a period of 5 hours. Then, the mixed solution of Composition 3 was added dropwise to the mixture at a constant rate over a period of one hour. Thereafter, the resultant mixture was stirred for 2 hours at 110° C. and then cooled to room temperature. Finally, the mixed solution of Composition 4 was added thereto followed by stirring.

The solid component concentration of the solution obtained was 65%. Also, when the compound was analyzed by GPC, the number average molecular weight was 4100.

EXAMPLE 1

(I)

| | |
|---|---|
| (A1) polymer obtained in Synthesis Example 1 | 75 parts |
| (B1) The compound shown by the formula | 15 parts |

$$(CH_3O)_3Si(CH_2)_3O+C(CH_2)_5O\}_{\overline{12}}\overset{\|}{\underset{O}{C}}-N\overset{H}{\underset{}{}}\overset{CH_3}{\underset{CH_3\ CH_3}{\diagup}}CH_2-$$

$$-N-\overset{\|}{\underset{O}{C}}+O(CH_2)_5\overset{\|}{\underset{O}{C}}\}_{\overline{12}}O-(CH_2)_3Si(OCH_3)_3$$

| | |
|---|---|
| (C1) KR-216 (trade name of silanol-containing organopolysiloxane, made by Shin-Etsu Chemical Co., Ltd.) | 20 parts |
| (B2) (CH$_3$O)$_3$Si(CH$_2$)$_{10}$Si(OCH$_3$)$_3$ KBM3106, (trade name, made by Shin-Etsu Chemical Co., Ltd.) | 10 parts |

To a mixture of the above components were added 0.3% of a leveling agent, #1970 (trade name, made by Kusumoto Kasei K.K.), and 3% of a mixture of DP-8 (dioctyl phosphate) (trade name, made by K.K. Daihachi Kagaku Kogyo Sho) and Farmin DM20 (N,N-dimethyldodecylamine) (trade name, made by Kao Corporation) at 1/1 by weight ratio as the curing catalysts (H) based on the total solid components.

The mixture was diluted with Solvesso #100 (aromatic high-boiling solvent) (trade name, made by Exon Chemical Co.) and, thus, the viscosity thereof was adjusted to from 15 to 20 seconds measured by a Ford Cap to provide a clear coating composition for a top coat.

(II) By following the same procedure as (I) described above except that an equivalent amount of the polymer obtained in Synthesis Example 2 was used in place of the polymer obtained in Synthesis Example 1 used as the component (A1) in (I), a clear coating composition for a top coat was prepared.

Coating was conducted as described below using each of the coating compositions prepared in (I) and (II) described above and the coating formed was evaluated by the methods described below. The results obtained are shown in Table 1 below.

A coated plate was prepared by coating an epoxyamide series electrodepositing primer for a motor car and an intermediate surfacer to a soft steel plate subjected to a degreasing treatment and a phosphoric acid addition treatment to provide a test piece, and a commercially available acrylic melamine resin coating composition (silver metallic base) was applied onto the test piece as a base coat. Then, the top coat clear coating compositions prepared in (I) and (II) described above were coated thereon by a wet-on-wet system, set for 20 minutes, and baked for 30 minutes at 120° C.

The dry thickness of the base coat was about 10 μm and that of the top clear coat was about 50 μm.

Du Pont Impact

A ½ inch impact plunger was used and the highest value thereof causing no abnormality on the coating was determined.

Rubbing Property

Each test plate was rubbed 200 times under the same condition using a absorbent cotton impregnated with MEK (methyl ethyl ketone). Then, the surface state was observed and the state having no change is evaluated as ⊚, the state having a little scratch on the surface as ◯, and a bad state as ×.

COMPARISON EXAMPLE 1

(III) By following the same procedure as (I) described above except that 100 parts of the polymer obtained in Synthesis Example 1 as the component (A1) in place of 120 parts of the total amount of composition (A1), composition (B1), composition (C1), and composition (B2), a clear coating composition for a top coat was prepared. Using the coating composition obtained, the coating formed was evaluated as in Example 1 and the results obtained are shown in Table 1 below.

TABLE 1

|  | Example 1 | | Comparison Example 1 |
|---|---|---|---|
| Top Coat Clear Coating Composition | Produced in (I) | Produced in (II) | Produced in (III) |
| Du Pont Impact | 500 g × 45 cm | 500 g × 50 cm | 500 g × 20 cm |
| MEK Rubbing | ◯ | ⊚ | × |

From the results shown in Table 1, it can be seen that the samples wherein the component (A) was produced using the macromonomer showed good solvent resistance.

SYNTHETIC EXAMPLE 3

Composition 1-3
Macromonomer

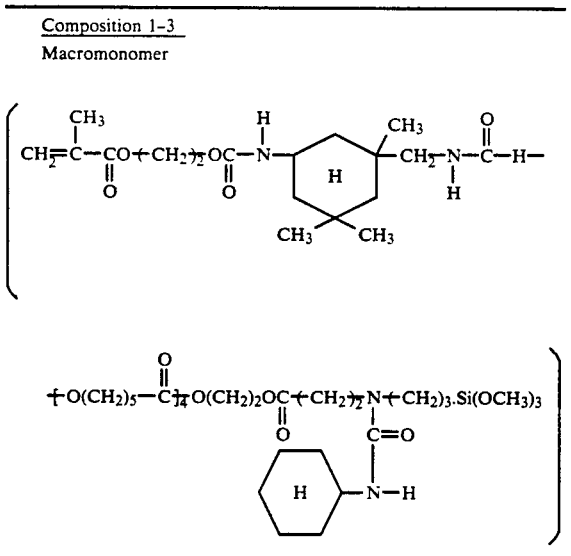

| ST | 30 g |
| MMA | 13 g |
| TSMA | 9 g |
| 2-Ethylhexyl Methacrylate | 16 g |
| AM | 1 g |
| TSSM | 3 g |
| MeOH | 2 g |
| AIBN | 4 g |
| BuAc | 8 g |
| Mixed solvent having the above components. | |

The same procedure as Synthesis Example 2 except that the mixed solution of composition 1-3 was used was conducted.

The solid component concentration of the solution obtained was 65% and when the compound obtained was analyzed by GPC, the number average molecular weight was 4200.

The composition was diluted with Solvesso #100 to a solid component concentration of 60%.

EXAMPLES 2 TO 6 AND COMPARISON EXAMPLES 2 AND 3

By compounding the polymer obtained in Synthesis Example 3 with each of the compositions shown in Table 2, clear coating compositions for a top coat were prepared.

Using each coating composition, the coating formed was evaluated as in Example 1 and the results are shown in Table 2 below.

In addition, in this case, the steps of coating setting, and baking were practiced under an absolute humidity of 0.01 wt./wt. (g-$H_2O$/kg-dry air). Also, pencil hardness, surface luster, and appearance were evaluated by the methods described blow.

Furthermore, (B3) in Table 2 is the compound shown by the following formula;

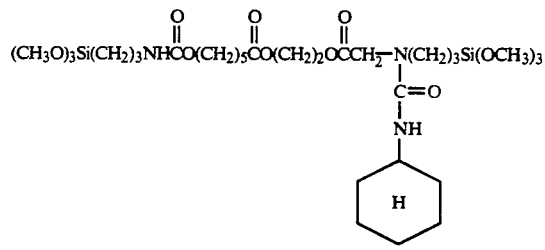

SH-6018 in the component (C) is a silanol-containing phenyl-substituted cyclic organosiloxane (trade name, made by Toray Silicone K.K.), and KR-212 is a silanol-containing organopolysiloxane (trade name, made by Shin-Etsu Chemical Co., Ltd.).

Pencil Harness

Measured according to JIS K 5400.

Surface Luster

A 60° mirror plane reflectivity was measured according to JIS K 5400.

External Appearance

Luster and padding feeling were visually wholly evaluated. The evaluations are ⊚, ◯,⊙, Δ, × which represent good, slightly good, usual, slightly bad, and bad, respectively.

TABLE 2

| | Comparison Example 2[*1] | Example 2 | Comparison Example 3 | Example 3 | Example 4 | Example 5 | Example 6 |
|---|---|---|---|---|---|---|---|
| Top Coat Clear Coating Composition (parts) | | | | | | | |
| Polymer prepared by Synthesis Example 3 | 100 | 64 | 64 | 64 | 64 | 64 | 64 |
| (B2) | 0 | 21 | 21 | 21 | 21 | 21 | 21 |
| (B3) | 0 | 15 | 15 | 15 | 15 | 15 | 15 |
| Component (C) | | | | | | | |
| Kind | SH-6018 | SH-6018 | — | SH-6018 | SH-6018 | SH-6018 | KR-212 |
| Amount (solid compounds) | 10 | 10 | 0 | 30 | 60 | 100 | 30 |
| Evaluation Result | | | | | | | |
| Pencil Hardness | F | H | F | 2H | 2H | 2H | HB |
| Surface Luster | 91 | 92 | 91 | 93 | 95 | 96 | 92 |
| External Appearance | ○ | ○ | | ○ | ◉ | ◉ | ○ |
| MED Rubbing Property | ◉ | ◉ | ◉ | ◉ | ◉ | ◉ | ○ |
| Ford Cap Viscosity (Solid content concentration 60%) (second) | 30.0 | 19.8 | 20.0 | 19.4 | 19.2 | 18.8 | 19.4 |

[*1]Since the viscosity thereof at a solid content concentration of 60% is high, the composition was diluted with Solveoso 100.

From the results shown in Table 2, it can be seen that in order to obtain high solids coatings having good external appearance, the three components, i.e., component (A), component (B), and component (C), are required. That is, in Comparison Example (2) containing no component (B), the composition does not have a high viscosity and a high solids coating is not formed, and in Comparison Example 3 containing no component (C), the coating is inferior in external appearance.

EXAMPLE 7 AND COMPARISON EXAMPLE 4

Using the coating compositions in Example 3 and Comparison Example 3, the steps from coating to evaluation were practiced under an absolute humidity of 0.001 wt./wt. and the results are shown in Table 3.

TABLE 3

| | Example 7 | Comparative Example 4 |
|---|---|---|
| Pencil Hardness | 2H | B |
| External Appearance | ○ | ◬ |
| MEK Rubbing Property | ◉ | C |

From the results in Table 3 above, it can be seen that the coating composition in Comparison Example 3 containing no component (C) is liable to be influenced by humidity and when the coating thereof is cured under low humidity, the properties are lowered due to an inferior cure.

As described above, the coating composition of this invention has improved curing property, can form a high solids coating, and also the external appearance of the coating formed is good.

While the invention has been described in detail and with reference to specific embodiments thereof, it will be apparent to one skilled in the art that various changes and modifications can be made therein without departing from the spirit and scope thereof.

What is claimed is:

1. A curable coating composition comprising
   (A) from 10 to 99 parts by weight of a first component which is a silyl group-containing vinylic polymer having a number average molecular weight of at least 3,000, wherein at least about 60% of the units constituting the main chain of the silyl group-containing vinylic polymer are vinylic units, said polymer having at least one hydrolyzable silyl group at a terminal of the main chain or at a side chain in each molecule,
   (B) from 1 to 90 parts by weight of a second component which is different from said first component, said second component being an organic compound having a number average molecular weight of not larger than 3,000 and having at least two hydrolyzable silyl groups at terminals in each molecule, and
   (C) from 1 to 500 parts by weight of a silanol-containing organopolysiloxane having an average of at least one silanol group per molecule to 100 parts by weight of the total amount of the component (A) and the component (B).

2. The coating composition of claim 1, wherein the hydrolyzable silyl-containing vinylic polymer (A) is a copolymer of a macromonomer (D) and a vinylic monomer (E), said macromonomer having a carbon-carbon double bond and a hydrolyzable silyl group in each molecule and having a number average molecular weight of from 400 to 5,000.

3. The coating composition of claim 1, wherein the silanol-containing organopolysiloxane (C) has an average of from 2 to 6 silanol groups in each molecule and has a number average molecular weight of from 200 to 3,000.

4. The coating composition of claim 1, wherein the silanol-containing organopolysiloxane (C) is a phenyl-substituted cyclic organopolysiloxane.

5. The coating composition of claim 1, wherein the composition further contains a hydrolyzable ester compound (F) as a dehydrating agent and an alkyl alcohol (G) as a solvent.

6. The coating composition of claim 1, wherein the composition further contains a curing catalyst (H).

7. The coating composition of claim 1, wherein the composition further contains at least one number selected from the group consisting of an ultraviolet absorbent (I) and a light stabilizer (J).

8. The coating composition of claim 2, wherein the macromonomer (D) contains

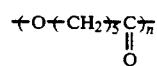

in the molecule.

9. The coating composition of claim 2, wherein the macromonomer (D) contains a urethane bond in the molecule.

10. The coating composition of claim 2, wherein the hydrolyzable silyl group-containing organic compound (B) has a number average molecular weight from 300 to 2,000.

* * * * *